United States Patent [19]

Berg

[11] Patent Number: 4,557,655
[45] Date of Patent: Dec. 10, 1985

[54] DELIVERY OF ARTICLES TO AND FROM A MECHANICAL TREATING MACHINE SERVED BY AN INDUSTRIAL ROBOT

[75] Inventor: Arne Berg, Västerås, Sweden
[73] Assignee: ASEA Aktiebolag, Västerås, Sweden
[21] Appl. No.: 491,554
[22] Filed: May 4, 1983
[30] Foreign Application Priority Data May 6, 1982 [SE] Sweden ............................ 8202833

[51] Int. Cl.⁴ ............................................. B65G 60/00
[52] U.S. Cl. .................................. 414/32; 198/339.1;
414/27; 414/102; 414/120; 414/226; 414/786; 901/7
[58] Field of Search ................... 414/27, 32, 33, 69, 414/101, 102, 110, 117, 118, 120, 121, 122, 222, 225, 226, 286, 276, 786; 901/6, 7; 198/339, 472

[56] References Cited

U.S. PATENT DOCUMENTS

| | | | |
|---|---|---|---|
| 3,429,466 | 2/1969 | Puderbach | 414/32 X |
| 3,976,208 | 8/1976 | Buix et al. | 414/32 |
| 4,083,908 | 4/1978 | Kalvenes et al. | 414/32 X |
| 4,197,772 | 4/1980 | Anderson et al. | 414/27 X |
| 4,201,284 | 5/1980 | Brems | 198/472 |

FOREIGN PATENT DOCUMENTS

| | | | |
|---|---|---|---|
| 2533975 | 2/1977 | Fed. Rep. of Germany | 414/32 |
| 2,744,446 | 4/1979 | Fed. Rep. of Germany | 414/32 |

Primary Examiner—Leslie J. Paperner
Attorney, Agent, or Firm—Watson, Cole, Grindle & Watson

[57] ABSTRACT

A method of and a magazine for serving machines for mechanical treatment with a robot. Articles to be machined are supplied on pallets on a first conveyor. A robot collects an article from a pallet on said conveyor, places it in the machine and collects a machined article and places it on a pallet on a second conveyor belt. The robot is connected to or grips an empty pallet and moves this from the first to the second conveyor belt.

9 Claims, 1 Drawing Figure

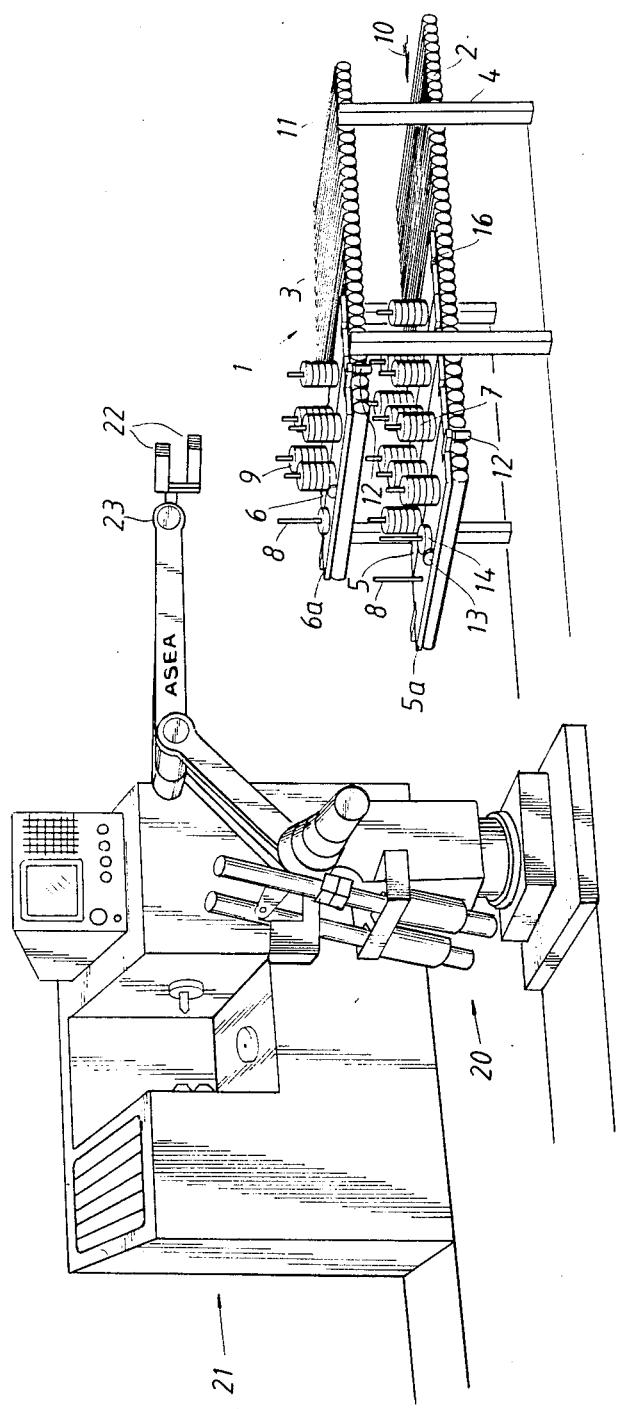

DELIVERY OF ARTICLES TO AND FROM A MECHANICAL TREATING MACHINE SERVED BY AN INDUSTRIAL ROBOT

BACKGROUND OF THE INVENTION

1. Field of the Invention

This invention relates to a method for supplying articles to, and transporting articles away from, an article-converting machine served by a robot, and to a magazine device for carrying out the method.

2. Description of the Prior Art

One aim in the manufacturing industry is to utilize mechanical equipment (typically expensive equipment) instead of a large manual workforce. This makes it possible to utilize the mechanical equipment during non-regular working hours, i.e., during so-called inconvenient working hours such as evenings, nights and weekends.

Industrial robots are an excellent aid which, by their versatility, can be easily programmed to carry out such duties as handling of workpieces when inserting them into working machines and removing them after processing.

The robot installations used up to now have been designed with fixed conveyor belts which have been adapted to a certain article, or with conveyor belts for pallets for a number of articles and with special hoisting or conveying members for removing empty pallets or transferring empty pallets from the "supply" conveyor belt to the "pick-up" conveyor belt. In the former case the conveyor belts have to be replaced or completely rebuilt when changing over to articles of a different shape. This involves drawbacks and high readjustment costs, in particular during manufacture in limited, periodically recurring series of similar articles in the same machining equipment. In the latter case, the magazine equipment will be complicated and expensive.

SUMMARY OF THE INVENTION

The invention aims to provide a method which makes it possible, with simple magazines, to achieve long unmanned operating periods in a robot installation, and magazine equipment designed for the application of the method.

A characteristic of the invention is that the articles which are to be machined are supplied on a first conveyor on pallets and are inserted into the article-converting machine by an industrial robot, and that converted, e.g. machined, articles are removed from the machine by the robot and are placed on a pallet on a second conveyor belt. When a pallet on the first conveyor belt is emptied, it is transferred to the second conveyor belt by the industrial robot.

A magazine device adapted for the method includes a first conveyor on which articles, which are placed on pallets, are delivered to the article-converting machine, and a second conveyor on which articles placed on the pallet are transported away. The articles are placed at specified positions on the pallets.

The pallets are provided with a device enabling an emptied pallet; to be gripped by the robot and be displaced from the first to the second conveyor. The device for gripping the pallet may consist of a dummy which is fixed on the pallet and has substantially the same shape as the unmachined articles.

The conveyors are suitably provided with fixing means at the unloading and loading stations of the pallets, which fix and lock the pallets in a well-defined position.

If one conveyor is placed above the other, the smallest possible area is occupied.

The conveyors may be inclined so that the pallets will be displaced by force of gravity, but they may also, or alternatively, be provided with means for transportation for stepwise displacement of pallets on the conveyor belts in connection with the transfer of an emptied pallet from one conveyor to the other.

On the conveyor containing machined articles, removal of pallets can be performed by means of the robot in such a way that the robot, when transferring an empty pallet, pushes away the pallets present on the conveyor belt.

BRIEF DESCRIPTION OF THE DRAWING

The invention will now be described in greater detail and by way of example, with reference to the accompanying drawing, the sole FIGURE of which is a schematic perspective view of magazine equipment for use with a conventional robot and article-treatment machine according to the invention.

DESCRIPTION OF THE PREFERRED EMBODIMENT

In the FIGURE, the reference numeral 1 designates a magazine comprising a lower roller conveyor 2, an upper roller conveyor 3 and supporting legs 4. A number of pallets 5 are arranged on the roller conveyor 2 and a number of pallets 6 are arranged on the roller conveyor 3. A robot 20 and a working machine 21 are positioned at the left-hand end of the magazine 1. Unmachined articles 7, for example disc-shaped gear blanks with a central shaft hole, are stored on the pallets 5 on the lower roller conveyor 2. In the embodiment shown, the unmachined articles 7, e.g. gear blanks, are threaded onto pins 8 mounted on the pallets. On the pallets 6 on the upper roller conveyor 3, articles 9 which have been machined on the working machine have been placed. The arrows 10 and 11 show the directions of transportation of the pallets 5 and 6, respectively on the roller conveyors. The roller conveyors may be inclined in such a way that gravity provides the driving force necessary for the displacement of the pallets along the conveyors. Alternatively the roller conveyors 2 and 3 may be provided with drive members (not shown) for displacing the pallets. At their outer parts, the roller conveyors 2 and 3 may be provided with locking devices 12 for fixing the outermost or endmost pallets 5a and 6a, respectively, in a precise position. To enable this precise positioning, the pallets may be provided with recesses 16 for locating the locking devices 12.

In use the lower roller conveyor 2 is loaded with a number of pallets containing unmachined articles 7. At the outermost end (i.e. the left end) of the upper roller conveyor 3, in a machine-unloading station, there is placed on empty pallet 6a on which machined articles 9 are to be placed. The robot 21 picks up an unmachined article 7 from the endmost pallet 5a, positioned in a machine-loading station, withdraws a machined article 9 from the working machine and inserts the unmachined article, previously picked up from the pallet 5a, into the working machine, and finally places the machined article 9, previously withdrawn from the working machine, onto the pallet 6a by means of the grippers 22 on the wrist 23 of the robot 20. When a pallet 5a is empty, the pallet 6a is full. The locking devices 12 are then opened, and the robot grips the emtpy pallet 5a in the machine-loading station, and places it at the outermost (i.e. leftmost) end of the roller conveyor 3, in the machine-unloading station, where it is locked by the locking devices 12. The pallets already present on the upper roller conveyor 3 are displaced in the direction of the arrow 11 either by force of gravity, by a drive device 21, or by the robot (not shown). The pallets 5 on the lower roller conveyor 2 are similarly transported one step in the direction of the arrow 10, whereafter the outermost pallet 5a is locked in the exact endmost position in the machine-loading station by the locking devices 12. The pallets may be provided with a gripping projection 13 for coupling the pallet 5a with a gripping device on the robot arm to enable transfer of the pallets from the machine-loading station to the machine-unloading station. Alternatively, each pallet may be provided with a fixed dummy 14, having the same shape and size as an unmachined article. In this latter case, when the ordinary grippers 22 of the robot 20 attempt to pick up the dummy 14, the entire pallet 5a is lifted up, and the pallet can thus be transported from the lower roller conveyor 2 to the upper roller conveyor 3.

The method and the robot installation herein described may be modified in many ways within the scope of the appended claims.

What is claimed is:

1. A method of supplying articles to, and transporting articles away from, an article-treatment machine, wherein the articles to be treated are:
    supplied to the article-treatment machine on pallets on a first roller conveyor,
    taken from a pallet and inserted into the article-treatment machine, and
    placed on a pallet on a second roller conveyor; and
    a pallet, when emptied of articles, is transferred from the first roller conveyor to the second roller conveyor by the robot serving the article-treatment machine.

2. A method of delivering articles to be treated to an article-treatment machine and for transporting the treated articles away from the article-treatment machine, the method including the steps of
    (a) providing a robot adjacent said article-treatment machine which is capable of conveying articles to be treated to the article-treatment machine and conveying treated articles away therefrom,
    (b) providing a first conveyor which has an operative end adjacent said robot,
    (c) providing a second conveyor which has an operative end adjacent said robot,
    (d) providing a plurality of pallets which can be positioned to move along either of said first and second conveyors, each pallet being capable of supporting at least one article to be treated or at least one treated article,
    (e) positioning one of said pallets which has no articles mounted thereon on said second conveyor at said operative end thereof,
    (f) causing at least one of said pallets which supports at least one article to be treated to move along said first conveyor to its operative end,
    (g) causing said robot to sequentially remove each article to be treated from the pallet at said operative end of said first conveyor and place it in said article-treatment machine and sequentially remove each treated article from said article-treatment machine and place it on said pallet at said operative end of said second conveyor, and
    (h) subsequent to step (g), causing said robot to pick up said pallet at said operative end of said first conveyor and place it at said operative end of said second conveyor, the pallet at said operative end of said second conveyor being concurrently moved along said second conveyor away from its operative end.

3. The method as claimed in claim 2, wherein the first and second conveyors provided in steps (b) amd (c) are roller conveyors.

4. The method as claimed in claim 2, wherein in step (c) said second conveyor is positioned above said first conveyor.

5. The method as claimed in claim 2, wherein in step (f) a plurality of pallets, each of which supports at least one article to be treated, are caused to move in sequence along said first conveyor towards its operative end.

6. A robot installation for conveying articles to be treated to an article-treatment machine and for conveying the treated articles away from the article-treatment machine, the robot installation including
    a robot adjacent said article-treatment device, said robot being capable of conveying articles to be treated to the article-treatment machine and conveying treated articles away therefrom,
    a first conveyor which has an operative end adjacent said robot and which can sequentially move pallets positioned thereof towards its operative end,
    a second conveyor which has an operative end adjacent said robot and which can move pallets positioned thereon away from its operative end, and
    a plurality of pallets which can be positioned on either of said first and second conveyors to be moved therealong, each of said pallets including supporting means for removably supporting at least one article to be treated or one treated article thereon and gripping means for enabling the robot to grip the pallet and move it from the operative end of the first conveyor to the operative end of the second conveyor.

7. A robot installation; according to claim 6, wherein the gripping means of each pallet comprises a dummy fixed thereto, said dummy having the same shape as the articles to be treated.

8. A robot installation according to claim 6, including support legs, said support legs supporting each of said first and second conveyors such that said second conveyor is positioned vertically above said first conveyor.

9. A robot installation according to claim 6, wherein each of said first and second conveyors includes a locking means for fixedly positioning a pallet at the operative end thereof.

* * * * *